Jan. 22, 1952      J. C. THOMPSON      2,583,398

INSTRUMENT READING TRAINING DEVICE

Filed Jan. 3, 1950      3 Sheets-Sheet 1

*Joseph Clay Thompson* INVENTOR.

BY

ATTORNEYS

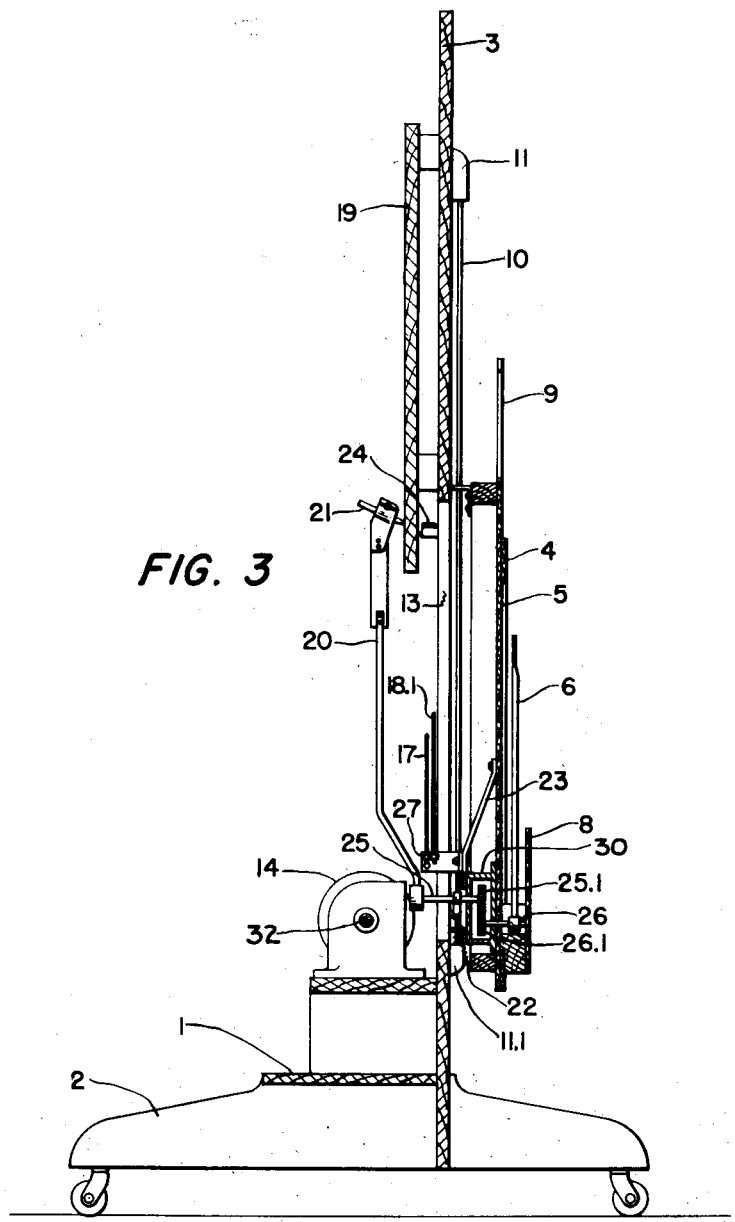

Patented Jan. 22, 1952

2,583,398

UNITED STATES PATENT OFFICE 2,583,398

INSTRUMENT READING TRAINING DEVICE

Joseph Clay Thompson, Davenport, Iowa, assignor to B. J. Palmer, Davenport, Iowa Application January 3, 1950, Serial No. 136,558

11 Claims. (Cl. 35—39)

My invention relates to an appliance for use in instructing and training students of chiropractic in the correct reading and interpretation of the indicator of the Neurocalometer and similar instruments.

The Neurocalometer is a patented instrument in common use by chiropractors to indicate areas of pressure upon nerves emitting or exiting from foramina on opposite sides of the spinal column and operates by indicating relative differences in temperature on opposite sides of the spinal column at given transverse planes. The dial of a Neurocalometer is ordinarily small and requires careful observation to obtain a correct reading from it.

The objects of my invention are to form an apparatus having an enlarged dial or scale with a hand or pointer whose variations will be large and readily observable, and to connect the pointer with a manually operable stylus coupled with the hand or pointer of the dial whereby the instructor can move the stylus either to right or left and produce a similar movement of the hand or pointer, while the dial is progressing upwardly; to mount a dial, pointer and stylus upon a vertical movable support or bracket arranged to simulate the travel of a Neurocalometer upwardly along the spine of a patient; to mount the pointer and stylus upon shafts which act as pivots and are connected by gearing so that the movement of the stylus toward one side or the other will cause the hand or pointer to move corresponding distances laterally but in the opposite direction; to mount the arm and dial on opposite sides of a backboard or support to prevent the students in front of the apparatus from seeing the movement of the stylus; to mount a pencil or marker upon the stylus arranged to make a line to record upon a special form-blank the deviation of the stylus from the center line at various distances along its course; to provide means for mechanically moving the dial and stylus upwardly at a uniform rate preferably approximately one second per inch of travel and to automatically stop the upward movement when the stylus and dial have reached the upper limit of travel, and means to automatically return them to starting position when a clutch is manually released, and to cushion their return.

I accomplish these objects by the means shown in the accompanying drawings, in which, Figure 1 is a front elevation of my apparatus with parts of the dial and guard broken away;

Figure 3 is a sectional elevation on the line 3—3 of Figure 1.

Similar numerals refer to similar parts throughout the several views.

Figure 1:
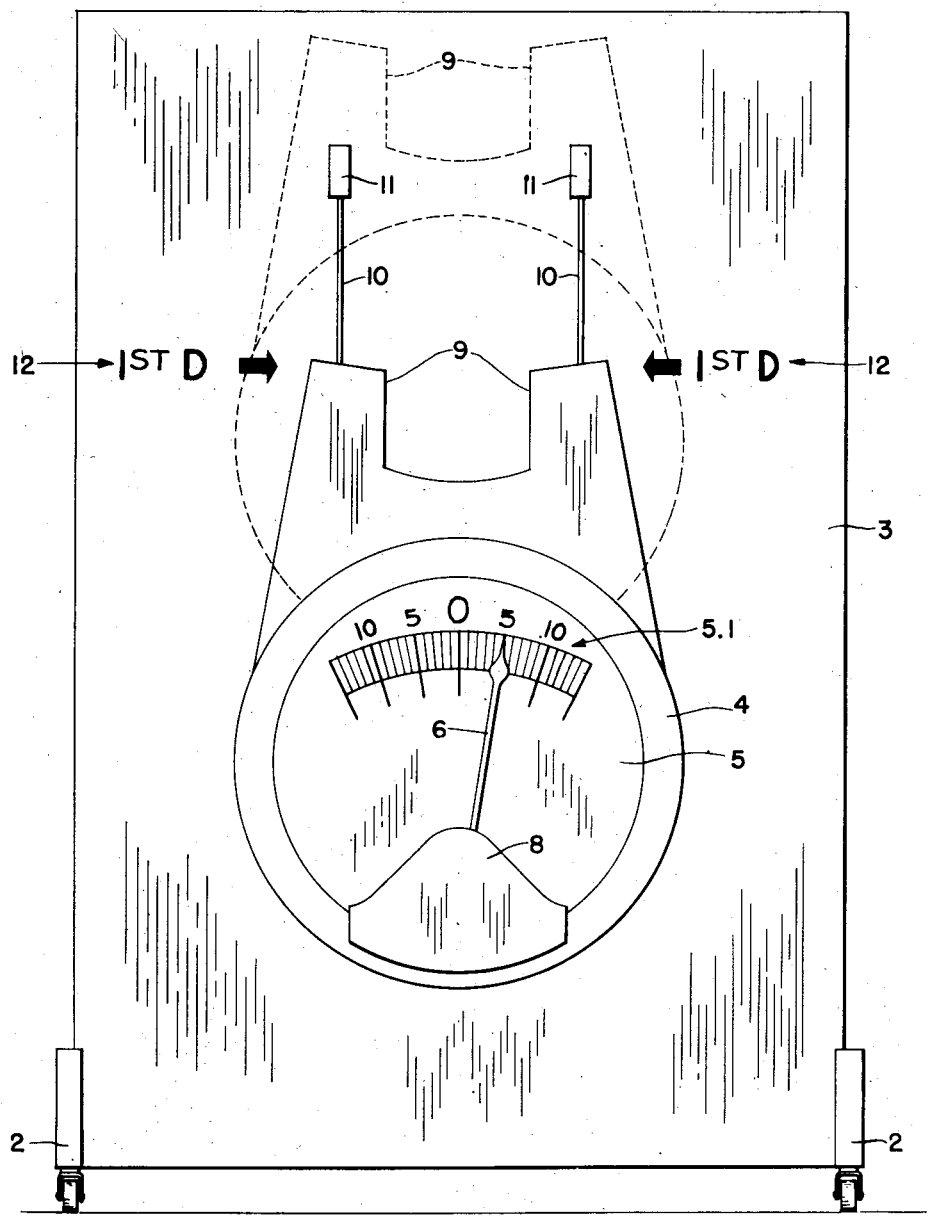
Figure 2:
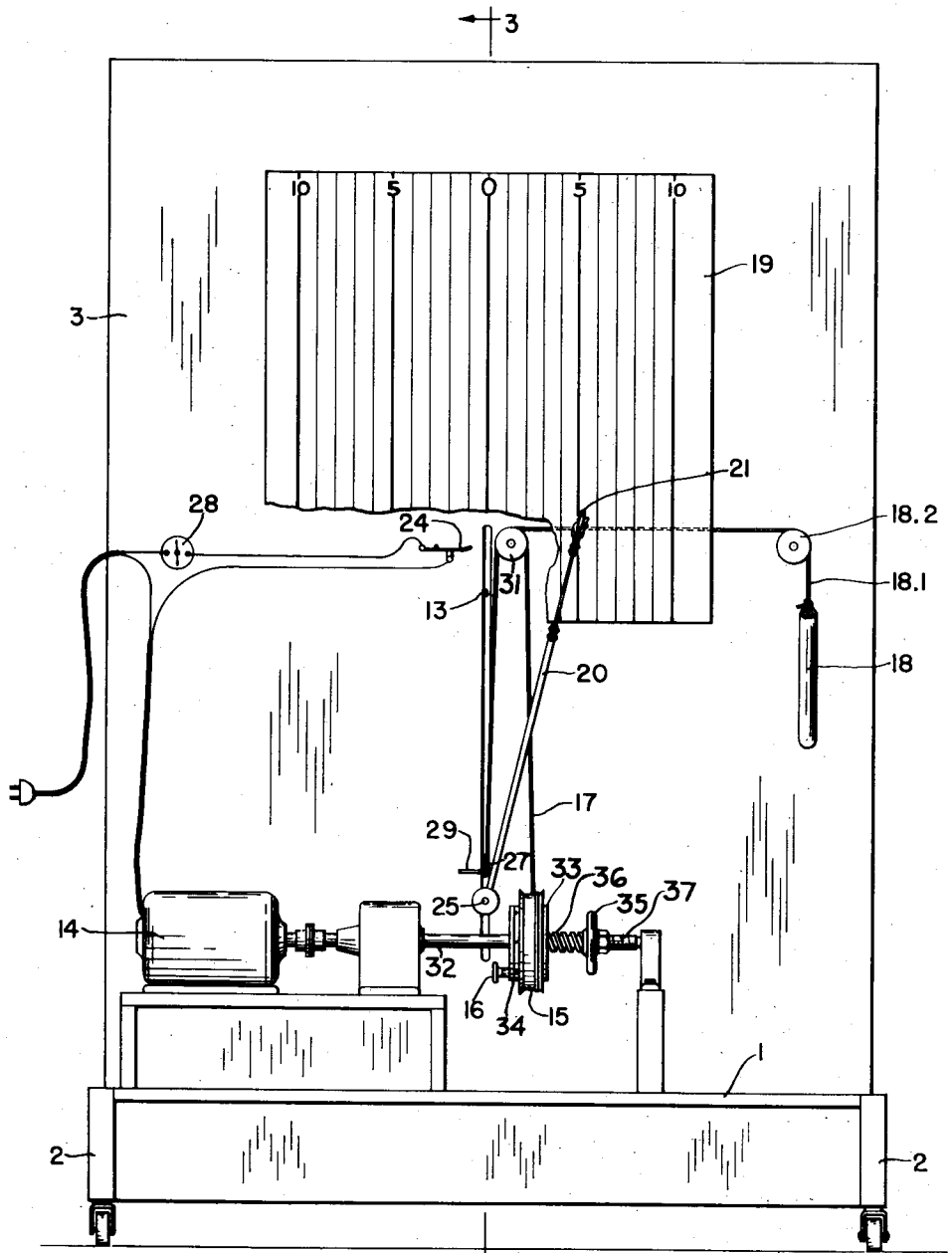
Figure 2 is a rear elevation.

My apparatus comprises a base 1 with feet 2 of suitable size and form. A backboard or screen 3 is united to the base and extends upwardly therefrom. A vertical slot 13 is formed in the middle of the back board. A bracket 27 is slidably mounted in and extends through the slot 13. On the front of the bracket 27 a dial 5 and dial frame 4 are mounted slidable freely upon vertical rods 10 supported by suitable blocks 11—11.1 united to the backboard.

On the rear of the bracket a gear box 30 is mounted with a pair of corresponding gears 25.1 and 26.1 secured in mesh in the gear box by shafts 25 and 26 respectively. The upper gear is mounted upon the shaft 25 to which the lower end of a manually operable stylus arm 20 is united. The lower shaft 26 has united thereto at its front end a hand or pointer 6 with its free end arranged to swing along a scale 5.1 marked upon the front of the dial.

A pair of balanced tension springs 22 are attached to the pointer and arranged to return it and the stylus to central position when the stylus is released by the operator.

An electric motor or other prime mover 14 is mounted upon the base with an extended shaft 32 upon which a clutch wheel or drum 15 is revolvably mounted between a clutch disc 34 and a brake disc 33 carried by and driven by the shaft 32. The clutch disc has mounted thereon a clutch pin 16 whereby the plate may be rigidly connected to the clutch wheel or drum 15 so that as the clutch plate is revolved by the shaft, it will carry the wheel or drum with it.

A main cable 17 has one end rigidly united to the wheel or drum 15 and is arranged to be wound upon the drum as it is revolved in one direction by the motor and to allow the drum and cable to unwind when the clutch is released.

The main cable passes over a pulley 31 mounted upon the backboard a suitable distance above the bracket 27 and then downwardly to the bracket to which it is rigidly attached.

A counter-balance weight 18 such as a sash weight, is mounted upon one end of a second cable 18.1 which passes over a pulley 18.2 and the pulley 31 and the opposite end of which is attached to the bracket. This weight is preferably slightly lighter than the weight of the dial, gear box and bracket so that the dial and bracket will descend from their own weight and the weight will be raised when the clutch is disengaged.

In order to provide adjustable means to limit the speed of descent of the bracket, dial and other attached parts, I mount a compression spring 36 upon the shaft extension with one end contacting a brake disc 33 adjacent the drum opposite the plate carrying the clutch pin 16 and its other end in contact with an adjusting wheel 35. This adjusting wheel has a hub with internal threads in mesh with corresponding threads 37 on a section of the shaft extension.

By turning the adjusting wheel in one direction, the pressure of the spring upon the brake disc is increased thereby causing the disc to press against the drum and act as a brake therefor.

By turning it in the opposite direction, the spring pressure will be reduced and the braking effect lessened as desired.

A graph board 19 is mounted upon the rear of the backboard and carries a graph form-blank upon which the pencil 21 of the stylus will trace a line showing the movement of the stylus arm as the dial and bracket are raised. The scale on the dial and the graph form-blank have corresponding divisions marked upon them so that a lateral deviation of five points or more on the graph will be indicated by a corresponding variation of the hand or pointer along the scale.

The gears are so arranged that the manual movement of the stylus laterally to the right or left of the operator facing the rear of the backboard will cause a similar movement of the hand or pointer to the right or left of a student viewing the dial from the front.

In the operation of this device, the apparatus is set with the dial, bracket and stylus arm at their lowermost position. The clutch pin is then placed in position to engage its corresponding opening in the drum and the motor is started by turning on a switch in the usual way.

As the clutch plate revolves, the clutch pin springs into its corresponding opening in the drum and the drum is turned by the shaft. As the drum turns it winds up the main cable 17 thus raising the bracket, stylus and dial and lowering the weight 18.

As the stylus and dial travel upwardly, the instructor may manually swing the stylus to the right or left of the central line and the pencil of the stylus marks a corresponding line upon the graph form-blank.

When the bracket has reached its uppermost limit of travel, the finger 29 attached to the bracket 27 actuates a cut-off switch 24 and stops the motor. The motor switch can then be turned off and the bracket and dial allowed to descend automatically by gravity to their lowermost position, thereby raising the counter-balance weight.

In the preferred form of my apparatus the dial and pointer are arranged to travel vertically a distance approximately equal to the average length of the spinal column of an adult human starting at a point representing the first dorsal vertebra traveling up and including the level of the axis and atlas.

In the course of his studies the student has necessarily become familiar with the entire human spine and with the relatively normal position and size of the various vertebrae, especially the cervical vertebrae and the position of the foramina from which the spinal nerves exit from the spinal column.

He also becomes familiar with various mal-positions and subluxations of one or more vertebrae and that such mal-positions or subluxations do or may cause pressure upon the nerves exiting from the spine whereby the transmission of impulses from the brain over the nerves to the various organs or regions supplied by and to which the nerves extend, are interfered with and that such pressures tend to cause heating at the point of pressure or produce so-called hot-boxes or hot-spots.

It is also well known that the function of the Neurocalometer is to disclose such hot-boxes or variations in temperature between opposite sides of the spine at comparable points. In the training of students of chiropractic it becomes of great importance for such students to practice using the Neurocalometer and to be readily able to observe and note accurately the variations of temperature between opposite sides of the spine as indicated by the Neurocalometer and to determine with accuracy the particular foramen at which the higher temperature exists, and the particular vertebra causing the pressure on a nerve.

Accordingly, in the use of applicant's apparatus the student is required to observe to which side the pointer is laterally deflected and the extent of such deflection, as well as to observe the relative distance above the starting point (assumed to be the level of the first dorsal vertebra) at which each deflection of the pointer to the right or left occurs.

The student is then required to either state verbally or to write down the direction and extent of the deflection of the pointer and the particular vertebra or foramen at which each such deflection occurred, basing his decision as to the particular vertebra upon the distance which the pointer traveled vertically from its starting point at the time of such deflection.

To assist the student in making that determination, the top of the bracket which carries the dial, and the upper part of the vertical rods upon which it travels, are in plain view so that the distance can be readily observed.

After the student has written or stated his conclusions, they are compared with the record made by the stylus and can thus be checked by the instructor and the student. Thus the student may be given much more extended practice than he could obtain by applying the Neurocalometer to living patients.

As an illustration the point "1st D" may be marked upon the backboard to represent the first dorsal vertebra. As the pointer swings from right to left, the student will be instructed to write down or record the movements of the hand or pointer relative to its lateral variation to the right or left of the center line and with reference to the particular cervical foramina at which the deviation from the center line occurs as well as the extent of such lateral deviation.

The instructor can thus cause the pointer to simulate the movements made by the pointer of a Neurocalometer, but upon a much larger scale, as in either actual cases which he has observed or in hypothetical cases as desired.

The students are then shown the graph made by the pencil of the stylus and required to compare the record they have made of the movements of the pointer with the graph made by the stylus. This affords a ready test of the accuracy of the students' observation and greatly facilitates their learning the use of the Neurocalometer and the visualization of the conditions indicated by it.

The various parts may be made of metal, wood or any other suitable material.

Various modifications may be made in the form and proportions of the various parts and I do not limit my claims to the precise forms shown in the drawings.

I claim:

1. In an educational appliance, a broad opaque vertical support having a central vertical slot in the lower part thereof, a bracket slidably mounted in the slot of the support, a pointer in front of the dial pivotally mounted upon the bracket, a stationary drawing board mounted on the support in the rear thereof, a manually operable arm having its lower end pivotally mounted upon the bracket and its upper end provided with a stylus extending into proximity with the drawing board, and corresponding intermeshing gears united to the pivots of the pointer and stylus arm arranged to compel simultaneous movement of the pointer when the stylus is manually moved laterally.

2. An appliance as described in claim 1, the drawing board being arranged to be contacted by a pencil carried by the stylus, and a graph blank form mounted upon the drawing board having divisions marked thereon corresponding to divisions marked upon the dial.

3. In an appliance for making graphs, the combination with the elements described in claim 2, of a pulley pivotally mounted upon the support above the bracket, a cable passing over said pulley with one end united to the bracket and the other end united to a counter-balance weight, a motor with extended shaft mounted upon the support, a drum loosely mounted upon the shaft extension, a clutch to connect the shaft in driving relation to the drum, and a cable passing around the drum having one end rigidly united to the drum and thence passing over a pulley above the bracket with its opposite end attached to the bracket whereby the bracket with the parts attached thereto will be raised by the cable when the drum is turned in one direction by the motor.

4. An appliance as described in claim 1, a pulley pivotally mounted upon the support above the bracket, and a cable passing over said pulley with one end united to the bracket and the other end united to a weight arranged to counter-balance the bracket and parts carried thereby.

5. An appliance as described in claim 4, and means to raise the bracket to a predetermined height and means to stop it at that point.

6. An appliance as described in claim 5, said means including a motor with extended shaft, a drum loosely mounted upon the shaft, a clutch arranged to secure the drum to the shaft, and a second cable having one end rigidly united to the drum and thence passing over a pulley mounted and spaced above the bracket with its opposite end attached to the bracket whereby the bracket with the parts attached thereto will be raised by the cable when the drum is turned in one direction.

7. An appliance as described in claim 6, the bracket being free to descend when the clutch is disengaged.

8. In an educational apparatus, the combination with a vertical support including a suitable base and a tall broad slab of opaque material mounted upon the base, of a vertically movable dial mounted in front of the slab, a stationary drafting board mounted at the rear of the slab, a pivoted pointer mounted in front of the dial, a movable arm pivotally mounted at the rear of the slab carrying a stylus arranged to contact the drafting board, and means to cause the stylus and the pointer to move vertically in unison and to move laterally simultaneously but in opposite directions.

9. In an educational apparatus, the combination with a vertical support including a suitable base and a broad slab of opaque material mounted upon the base, of a vertically movable dial mounted in front of the slab, a stationary drafting board mounted at the rear of the slab, a pointer for the dial, a movable arm at the rear of the slab carrying a stylus arranged to contact the drafting board, a bracket slidably mounted in a vertical slot formed in the lower part of the slab on which bracket the stylus arm and pointer are pivoted, a pulley pivotally mounted upon the support above the bracket, a cable passing over said pulley with one end united to the bracket and the other end united to a counter-balance weight, a motor with extended shaft mounted upon the support, a drum loosely mounted upon the shaft extension, a clutch plate carried by the shaft adjacent the drum having a clutch pin mounted therein arranged to engage the drum, and a second cable connected to the bracket passing over a pulley above the bracket and windable upon the drum to raise the bracket.

10. In an educational apparatus, the combination with a vertical support including a suitable base and a slab of opaque material mounted upon the base, of a vertically movable dial mounted in front of the slab, a stationary drafting board mounted at the rear of the slab, a pointer for the dial, a movable arm pivotally mounted at the rear of the slab carrying a stylus arranged to contact the drafting board, a bracket slidably mounted in a vertical slot formed in the lower part of the slab on which the stylus arm and pointer are pivoted, a pulley pivotally mounted upon the support above the bracket, a cable passing over said pulley with one end united to the bracket and the other end united to a counter-balance weight, a motor with extended shaft mounted upon the support, a drum loosely mounted upon the shaft extension, a clutch to connect the shaft in driving relation to the drum, and a second cable passing around the drum having one end rigidly united to the drum and thence passing over a pulley above the bracket with its opposite end attached to the bracket whereby the bracket with the parts attached thereto will be raised by the cable when the drum is turned in one direction by the motor.

11. An appliance as described in claim 10, a brake plate carried by the shaft adjacent the drum, an adjusting wheel threaded upon the shaft, and a compression helical spring slidably mounted upon the shaft between the brake-plate and the adjusting wheel.

JOSEPH CLAY THOMPSON.

REFERENCES CITED

The following references are of record in the file of this patent:

UNITED STATES PATENTS

| Number | Name | Date |
|---|---|---|
| 490,011 | Dibble | Jan. 17, 1893 |
| 793,767 | Burke | July 4, 1905 |
| 1,536,119 | McDonald | May 5, 1925 |
| 1,858,153 | Hammond | May 10, 1932 |
| 2,307,534 | Olson | Jan. 5, 1943 |
| 2,471,368 | Ekstrom | May 24, 1949 |